United States Patent
Halingale

(10) Patent No.: US 10,745,241 B2
(45) Date of Patent: Aug. 18, 2020

(54) COMMUNICATION WITH A TRAPPED PASSENGER IN A TRANSPORTATION SYSTEM

(71) Applicant: Otis Elevator Company, Farmington, CT (US)

(72) Inventor: Paras Kumar Halingale, Hyderabad (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 396 days.

(21) Appl. No.: 15/683,140

(22) Filed: Aug. 22, 2017

(65) Prior Publication Data
US 2018/0057307 A1 Mar. 1, 2018

(30) Foreign Application Priority Data
Aug. 24, 2016 (IN) .............................. 201611028812

(51) Int. Cl.
| | |
|---|---|
| B66B 3/00 | (2006.01) |
| B66B 5/00 | (2006.01) |
| B66B 1/02 | (2006.01) |
| B66B 1/34 | (2006.01) |
| H04N 7/14 | (2006.01) |
| H04N 7/18 | (2006.01) |

(52) U.S. Cl.
CPC ............ B66B 3/002 (2013.01); B66B 1/02 (2013.01); B66B 1/3461 (2013.01); B66B 5/0006 (2013.01); B66B 5/0018 (2013.01); H04N 7/147 (2013.01); H04N 7/188 (2013.01); *B66B 1/34* (2013.01); *B66B 5/0012* (2013.01)

(58) Field of Classification Search
CPC ......... B66B 3/002; B66B 1/02; B66B 1/3461; B66B 5/0006; B66B 5/0018
USPC ....................................................... 187/390
See application file for complete search history.

(56) References Cited

U.S. PATENT DOCUMENTS

| | | | | |
|---|---|---|---|---|
| 5,736,694 | A | * 4/1998 | Ketoviita | ............... B66B 5/0006 187/247 |
| 5,844,181 | A | 12/1998 | Amo et al. | |
| 6,196,355 | B1 | * 3/2001 | Fargo | ......................... B66B 3/00 187/287 |

(Continued)

FOREIGN PATENT DOCUMENTS

| | | |
|---|---|---|
| CN | 201567123 U | 9/2010 |
| CN | 202116149 U | 1/2012 |

(Continued)

OTHER PUBLICATIONS

European Search Report for application EP 17186685.8, dated Feb. 26, 2018, 9 pages.

(Continued)

*Primary Examiner* — David S Warren
(74) *Attorney, Agent, or Firm* — Cantor Colburn LLP

(57) ABSTRACT

According to an embodiment, a method to communicate with a passenger in a car within a transportation system includes receiving an alarm signal from the car, receiving at least one operation parameter from the car, analyzing the at least one operation parameter corresponding to the alarm signal from the car, determining an alarm condition in response to the at least one operation parameter and the alarm signal, and initiating a video session via a video system in response to the alarm signal.

18 Claims, 2 Drawing Sheets

(56) References Cited

U.S. PATENT DOCUMENTS

| | | | |
|---|---|---|---|
| 6,269,910 B1* | 8/2001 | Fargo | B66B 3/00 187/287 |
| 6,341,668 B1 | 1/2002 | Fayette et al. | |
| 6,349,797 B1 | 2/2002 | Newville et al. | |
| 6,364,066 B1* | 4/2002 | Bolch | B66B 5/0018 187/391 |
| 6,543,582 B2 | 4/2003 | Difranza et al. | |
| 6,847,292 B2* | 1/2005 | Nlabu | B66B 5/027 187/390 |
| 7,448,473 B2* | 11/2008 | Lindberg | B66B 1/34 187/384 |
| 8,365,871 B2* | 2/2013 | Lee | B66B 5/027 187/247 |
| 9,051,155 B2* | 6/2015 | Herkel | B66B 1/34 |
| 10,029,884 B2* | 7/2018 | Youker | B66B 3/008 |
| 2002/0036122 A1 | 3/2002 | Fayette et al. | |
| 2002/0053978 A1* | 5/2002 | Peterson | G08B 7/06 340/573.1 |
| 2003/0117292 A1* | 6/2003 | Nlabu | B66B 5/027 340/5.2 |
| 2004/0231929 A1* | 11/2004 | Sasaki | B66B 5/025 187/391 |
| 2007/0261924 A1* | 11/2007 | Lindberg | B66B 1/34 187/391 |
| 2009/0283369 A1* | 11/2009 | Flynn | B66B 1/468 187/391 |
| 2011/0155516 A1* | 6/2011 | Mason | B66B 5/024 187/384 |
| 2013/0270046 A1* | 10/2013 | Krause | B66B 13/08 187/393 |
| 2014/0139539 A1 | 5/2014 | Byers | |
| 2015/0068849 A1 | 3/2015 | Haipus et al. | |
| 2015/0075914 A1* | 3/2015 | Armistead | B66B 1/46 187/247 |
| 2015/0219777 A1* | 8/2015 | Smith | G01V 1/28 702/14 |
| 2015/0293799 A1* | 10/2015 | Sekine | B66B 5/0006 714/37 |
| 2016/0264377 A1* | 9/2016 | Beloin | B66B 1/3461 |
| 2016/0292522 A1* | 10/2016 | Chen | B66B 1/3476 |
| 2016/0295192 A1* | 10/2016 | Hsu | B66B 1/2408 |
| 2016/0295196 A1* | 10/2016 | Finn | G06T 7/11 |
| 2017/0073187 A1* | 3/2017 | Youker | B66B 3/008 |
| 2018/0057307 A1* | 3/2018 | Halingale | B66B 1/02 |
| 2018/0118507 A1* | 5/2018 | Jyotik | B66B 1/3453 |
| 2018/0179021 A1* | 6/2018 | Uchida | B66B 1/28 |
| 2018/0265333 A1* | 9/2018 | Schuster | B66B 13/14 |
| 2018/0346284 A1* | 12/2018 | Swami | B66B 5/0012 |
| 2019/0272735 A1* | 9/2019 | Carparelli | G08B 25/14 |
| 2019/0337759 A1* | 11/2019 | Dube | B66B 3/002 |

FOREIGN PATENT DOCUMENTS

| | | |
|---|---|---|
| CN | 202704744 U | 1/2013 |
| CN | 103171940 A | 6/2013 |
| CN | 103910262 A | 7/2014 |
| CN | 203903712 U | 10/2014 |
| CN | 104140022 A | 11/2014 |
| CN | 203976154 U | 12/2014 |
| CN | 104925614 A | 9/2015 |
| CN | 105480806 A | 4/2016 |
| JP | 2000118900 A | 4/2000 |
| KR | 20120115041 A | 10/2012 |
| WO | 0044662 A1 | 8/2000 |
| WO | 2006115334 A1 | 11/2006 |
| WO | 2013082895 A1 | 6/2013 |
| WO | 2014129786 A1 | 8/2014 |
| WO | 2016087557 A1 | 6/2016 |

OTHER PUBLICATIONS

Kim, Woon-Yong, "The Implementation Model of the Emergency Video Call System for Deep-Depth and High-Rise Building Lifts", Indian Journal of Science and Technology, vol. 8(25), DOI: 10.17485/ijst/2015/v8i25/80441, Oct. 2015, 9pgs.

Touch to Go Technologies, "Elevator Touchscreen Systems, 2014 product catalog", MAD Elevator Fixtures, Mar. 26, 2014, 44pgs.

* cited by examiner

COMMUNICATION WITH A TRAPPED PASSENGER IN A TRANSPORTATION SYSTEM

FOREIGN PRIORITY

This application claims priority to Indian Patent Application No. 201611028812, filed Aug. 24, 2016, and all the benefits accruing therefrom under 35 U.S.C. § 119, the contents of which in its entirety are herein incorporated by reference.

DESCRIPTION OF RELATED ART

The subject matter disclosed herein relates generally to the field of transportation systems, and more particularly to communication systems within transportation systems.

Alarms are often utilized in elevator systems to allow a passenger to communicate a malfunction or emergency condition within the elevator. A passenger can initiate an alarm signal from within the elevator by using a dedicated button on a control panel to signal a malfunction or that they are trapped within the elevator.

While passenger initiated alarms can signal that a passenger is trapped in an elevator or a malfunction, a passenger may inadvertently trigger an alarm signal or may trigger an alarm in a scenario the passenger is able to resolve. A system and method that can allow communication with a passenger in the elevator car to resolve alarm conditions is desired.

BRIEF SUMMARY

According to an embodiment, a method to communicate with a passenger in a car within a transportation system includes receiving an alarm signal from the car, receiving at least one operation parameter from the car, analyzing the at least one operation parameter corresponding to the alarm signal from the car, determining an alarm condition in response to the at least one operation parameter and the alarm signal, and initiating a video session via a video system in response to the alarm signal.

In addition to one or more of the features described above, or as an alternative, further embodiments could include that the car is an elevator car.

In addition to one or more of the features described above, or as an alternative, further embodiments could include determining a true alarm condition or a false alarm condition in response to the at least one operation parameter and the alarm signal.

In addition to one or more of the features described above, or as an alternative, further embodiments could include initiating the video session via the video system with a dispatch center in response to the false alarm condition.

In addition to one or more of the features described above, or as an alternative, further embodiments could include initiating the video session via the video system with a dispatch center in response to the true alarm condition.

In addition to one or more of the features described above, or as an alternative, further embodiments could include initiating a communication session with a technician device via the dispatch center.

In addition to one or more of the features described above, or as an alternative, further embodiments could include providing the dispatch center with the at least one operation parameter from the car via a control system.

In addition to one or more of the features described above, or as an alternative, further embodiments could include providing a control signal from the dispatch center to the car.

In addition to one or more of the features described above, or as an alternative, further embodiments could include displaying a video via the video system in response to the false alarm condition.

In addition to one or more of the features described above, or as an alternative, further embodiments could include initiating the alarm signal in response to a trapped passenger condition.

According to an embodiment, a system for communication with a passenger within a transportation system includes a car of the transportation system to provide an alarm signal, wherein the car includes a video system, a control system to provide at least one operation parameter corresponding to the car, an alarm response controller to analyze the at least one operation parameter corresponding to the alarm signal and to selectively determine an alarm condition, wherein the alarm response controller initiates a video session via the video system in response to the alarm signal.

In addition to one or more of the features described above, or as an alternative, further embodiments could include that the car is an elevator car.

In addition to one or more of the features described above, or as an alternative, further embodiments could include that the alarm response controller determines a true alarm condition or a false alarm condition for the alarm condition.

In addition to one or more of the features described above, or as an alternative, further embodiments could include that the alarm response controller initiates the video session via the video system with a dispatch center in response to the false alarm condition.

In addition to one or more of the features described above, or as an alternative, further embodiments could include that the alarm response controller initiates a video session with a dispatch center in response to the true alarm condition.

In addition to one or more of the features described above, or as an alternative, further embodiments could include that the alarm response controller initiates a communication session with a technician device and the dispatch center.

In addition to one or more of the features described above, or as an alternative, further embodiments could include that the dispatch center receives at least one operation parameter from the control system.

In addition to one or more of the features described above, or as an alternative, further embodiments could include that the dispatch center provides a control signal to the car.

In addition to one or more of the features described above, or as an alternative, further embodiments could include that the video system includes a video camera and a video screen.

In addition to one or more of the features described above, or as an alternative, further embodiments could include that the car includes a control panel to selectively provide the alarm signal.

Technical function of the embodiments described above includes determining an alarm condition in response to the at least one operation parameter and the alarm signal, and initiating a video session via a video system in response to the alarm signal.

Other aspects, features, and techniques of the embodiments will become more apparent from the following description taken in conjunction with the drawings.

BRIEF DESCRIPTION OF THE SEVERAL VIEWS OF THE DRAWINGS

The subject matter is particularly pointed out and distinctly claimed in the claims at the conclusion of the specification. The foregoing and other features, and advantages of the embodiments are apparent from the following detailed description taken in conjunction with the accompanying drawings in which like elements are numbered alike in the several FIGURES:

DETAILED DESCRIPTION

Figure 1:
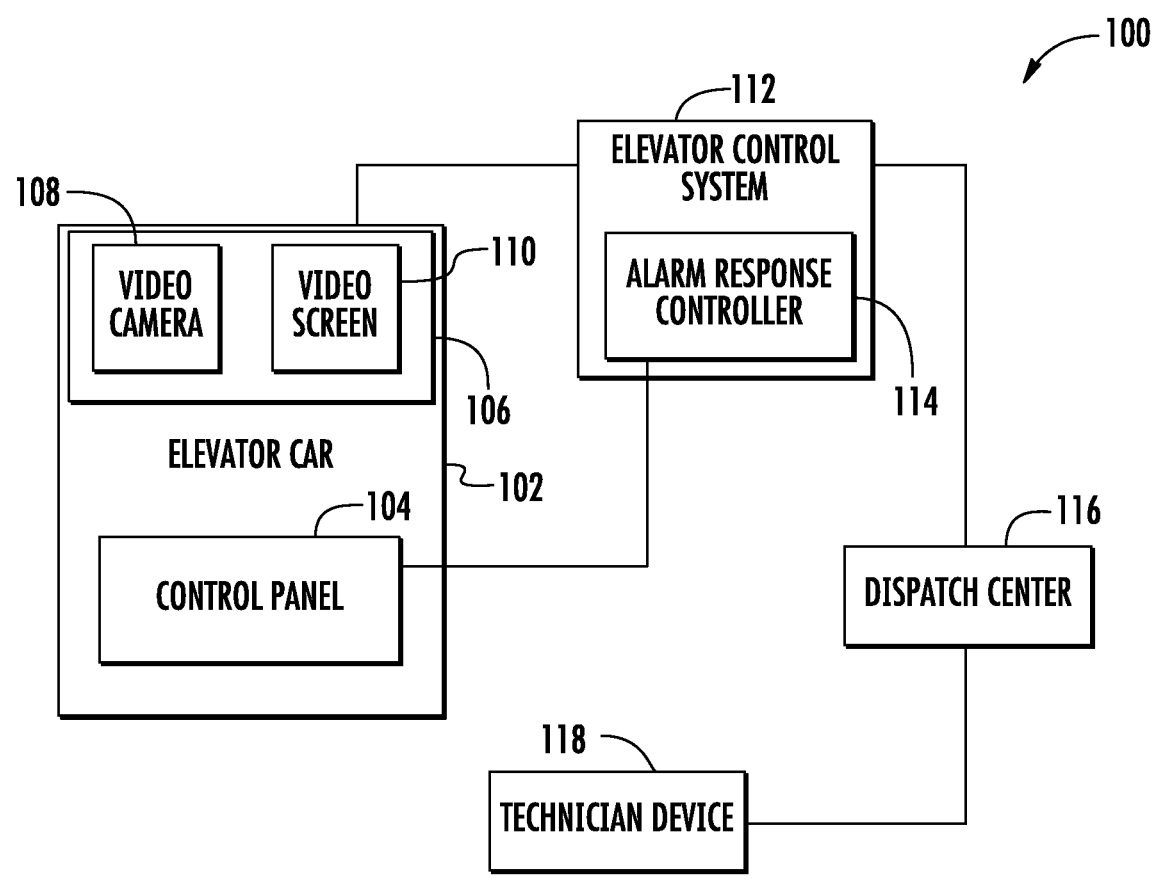
FIG. 1 shows an elevator system.

Referring to the drawings, FIG. 1 shows an elevator system 100. In the illustrated embodiment, the elevator system 100 includes an elevator car 102 with a video system 106, and an elevator control system 112. In the illustrated embodiment, the elevator system 100 can be utilized to facilitate communication with a passenger in the elevator car 102 in response to alarm conditions or signals. The elevator system 100 can be utilized to determine if an alarm condition is a true alarm condition, an inadvertent alarm condition, or an alarm condition that can be addressed by a passenger. In response to an alarm signal, the video system 106 can be utilized to communicate with the passenger. Advantageously, the elevator system 100 can allow communication with a passenger to allow the passenger to address the alarm condition or to allow video communication with the passenger to allow for dispatchers or technicians to address an alarm condition while calming the passengers. While an elevator system 100 is contemplated herein, the methods and apparatuses described herein can be used with any suitable transportation system, including, but not limited to elevators, subways, trains, trams, gondolas, monorails, busses, trolleys, etc.

The elevator system 100 can include multiple elevator cars 102 to transport passengers as desired. In the illustrated embodiment, the elevator car 102 includes a control panel 104. The control panel 104 allows a passenger to interact with and direct the elevator car 102. During normal operation, the control panel 104 can receive operational commands and inputs from the passenger to transport a passenger to a desired floor, open the doors, close the doors, etc. A passenger can utilize the control panel 104 to trigger an alarm signal in response to any suitable emergency or alarm condition. In certain situations, a passenger can utilize the alarm signal to indicate a trapped passenger condition. A passenger may accurately signal a trapped passenger condition, while in other embodiments, a passenger may inaccurately signal a trapped passenger condition by inadvertently triggering an alarm signal. In some embodiments, a passenger may inaccurately signal a trapped passenger condition that may be resolved without any external assistance.

In the illustrated embodiment, the elevator car 102 includes the video system 106. In the illustrated embodiment, the video system 106 includes a video camera 108 and a video screen 110. During normal operation, the video screen 110 can be utilized to display information and videos to passengers. The video screen 110 can further be utilized to display information or videos in response to an alarm condition. The video camera 108 can be utilized to allow for two way video communications between someone outside of the elevator car 102 such as, for example, building, emergency, or elevator personnel, and a passenger within the elevator car 102. In certain situations, two way video communications can allow personnel to communicate, instruct and calm a passenger in response to a trapped passenger condition.

In the illustrated embodiment, the elevator car 102 can be controlled and monitored by the elevator control system 112. In the illustrated embodiment, the elevator control system 112 can receive signals from the elevator car 102 and the control panel 104 to control movement of the elevator car 102 through an elevator shaft. Further, the elevator control system 112 can monitor the status of the elevator car 102 and the elevator system 100 using feedback from sensors and other means to determine operating parameters. For example, the elevator control system 112 can determine operating status, parameters, faults, etc. of the elevator car 102.

In the illustrated embodiment, the alarm response controller 114 can receive alarm signals from the elevator car 102 and the elevator control system 112. In the illustrated embodiment, the alarm response controller 114 is integrated with the elevator control system 112. In other embodiments, the alarm response controller 114 is independent from the elevator control system 112. In the illustrated embodiment, the alarm response controller 114 can analyze operating parameters of the elevator car 102 in response to an alarm signal to determine if the alarm signal or condition provided is a true alarm condition or a false alarm condition. In the illustrated embodiment, the alarm response controller 114 can identify operating parameters that are consistent with trapped passenger conditions to determine if the alarm signal or condition provided is a true alarm condition or a false alarm condition. In certain embodiments the alarm response controller 114 can monitor operating parameters, including, but not limited to door state, elevator car position, velocity, error codes, etc., to determine elevator system 100 statuses. The alarm response controller 114 can utilize algorithms to monitor the operating parameters to determine if elevator system 100 operations are normal or enter a shutdown state in response to error conditions. In certain embodiments, if an alarm signal is received while the elevator system 100 is considered normal; the alarm response controller 114 can determine the alarm signal is a false alarm. Similarly, if the alarm signal is received while the elevator system 100 is in an error condition, the alarm response controller 114 can determine that the alarm signal is a true alarm. Alternatively, in certain embodiments, the dispatch center 116 can receive operating parameters of the elevator car 102 in response to an alarm signal to allow a technician or an automated method determine if the alarm signal or condition provided is a true alarm condition or a false alarm condition.

In certain embodiments, the alarm response controller 114 can determine if an alarm condition is a false alarm condition if the alarm signal is provided when the elevator car 102 is operating properly or the elevator car 102 doors are in an open condition by monitoring operating parameters described above. In these scenarios it may be determined that the alarm signal was inadvertently triggered by a passenger using the control panel 104. In other embodiments, a passenger may intentionally trigger an alarm signal using the control panel. However, the alarm response controller 114 can monitor error conditions and the presence of a shutdown state of the elevator car 102 and the elevator control system 112 to determine if the elevator car 102 is operational. In this scenario, the alarm response controller 114 can determine if the alarm condition provided by the passenger can be resolved by the passenger or is otherwise a false alarm condition, as described below.

In response to a determined false alarm condition, the alarm response controller 114 can initiate a display of information or an informative video to be displayed on the video screen 110. The information provided can inform the passenger if any action is needed or otherwise how to resolve the alarm condition. In certain embodiments, the information displayed on the video screen 110 can describe the cause of the false alarm and allow input to determine if the alarm signal is not a false alarm. In certain embodiments, a user can provide confirmation of an alarm signal via the control panel 104 or using the video system 106. In certain embodiments, a video conference between the elevator car 102 and the dispatch center 116 can be initiated while notifying the dispatch center 116 the video conference is corresponding to a determined false alarm condition.

In response to a true alarm condition, the alarm response controller 114 can initiate a video conference between the elevator car 102 and a dispatch center 116 using the video system 106 within the elevator car 102. Similarly, the dispatch center 116 can be equipped with a video camera and a video screen to allow two way video conferencing between the passenger and a dispatcher or technician. Advantageously, the dispatch center 116 and a passenger within the elevator car 102 can use video conferencing to improve the experience of the trapped passenger. In certain embodiments, the dispatch center 116 can utilize a remote dispatcher to comfort a passenger, provide the passenger with instructions, or provide commands to the elevator car 102 remotely. In certain embodiments, if the dispatch center 116 determines that they cannot resolve the alarm condition, the dispatch center 116 can contact a technician via a technician device 118. In certain embodiments, the technician device 118 can have a communication link with the video system 106 to allow audio and/or video communication with the passenger. The technician device 118 can be any suitable device, including, but not limited to a cellular phone, a tablet computer, a portable computer, etc. Among other things, the dispatch center may be the elevator manufacturer, maintenance service provider, building manager, or any other third party that is not trapped in the elevator.

Figure 2:
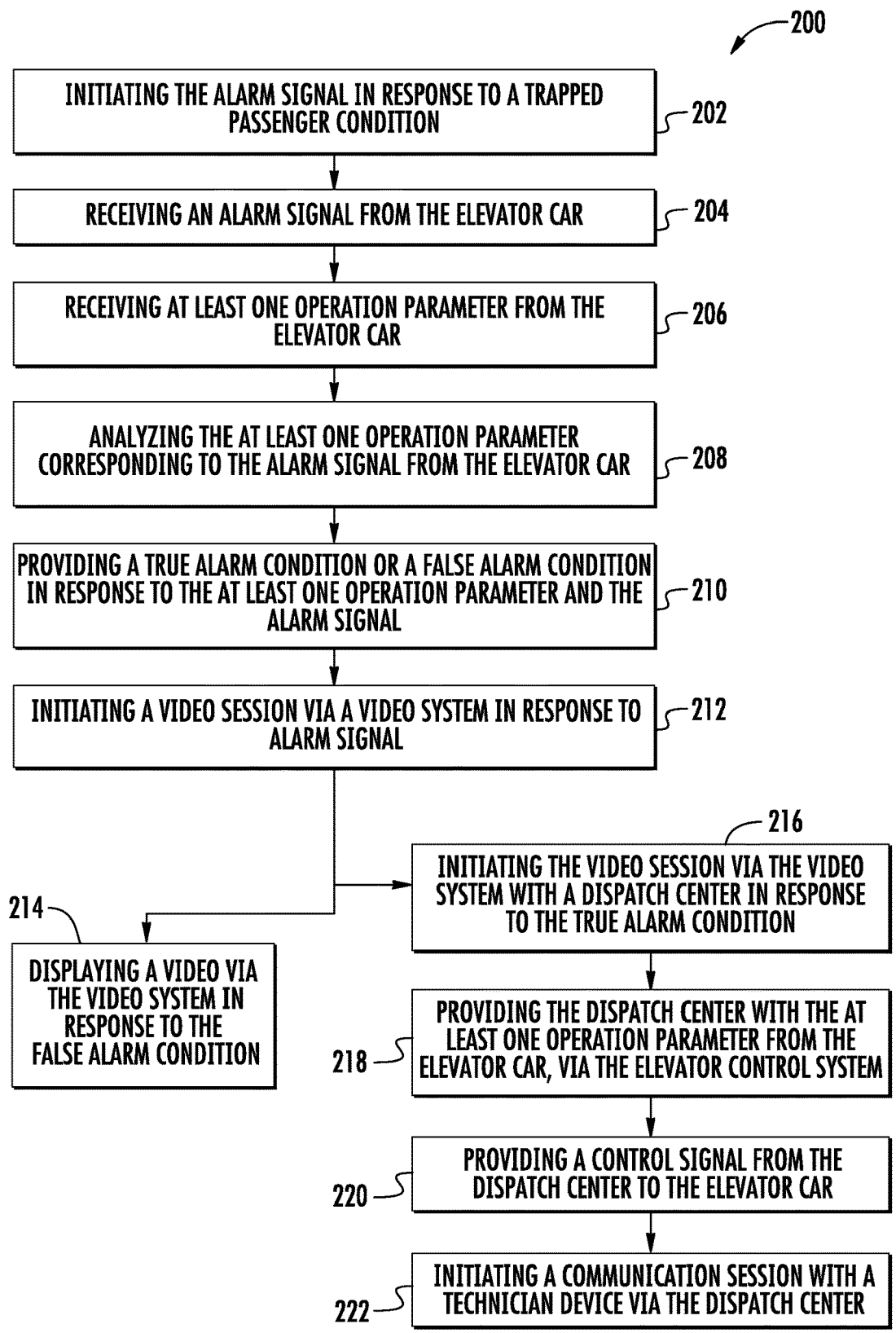
FIG. 2 shows a method to communicate with passengers within an elevator car.

Referring to FIG. 2, a method 200 to communicate with passengers within an elevator car is shown. In operation 202 the alarm signal is initiated in response to a trapped passenger condition.

In operation 204 an alarm signal is received from the elevator car. In response to emergency situations, a passenger can utilize the control panel to trigger an alarm signal in response to any suitable emergency or alarm condition.

In operation 206 at least one operation parameter is received from the elevator car. In certain embodiments the alarm response controller can monitor operating parameters, including, but not limited to door state, elevator car position, velocity, error codes, etc., to determine elevator system statuses. The alarm response controller can utilize algorithms to monitor the operating parameters to determine if elevator system operations are normal or enter a shutdown state in response to error conditions. In certain embodiments, the alarm response controller can monitor for the presence of a "shutdown state." The shutdown state may be received via a CAN message.

In operation 208 the at least one operation parameter corresponding to the alarm signal from the elevator car is analyzed. In the illustrated embodiment, the alarm response controller can analyze elevator car parameters and elevator control system parameters to determine if a user provided alarm signal is a false alarm condition. In operation 210 a true alarm condition or a false alarm condition is provided in response to the at least one operation parameter and the alarm signal. In operation 212 a video session via a video system is initiated in response to the alarm signal.

If the alarm response controller determines that the alarm signal indicates a false alarm condition, in operation 214 a video is displayed via the video system in response to the false alarm condition. The information provided can inform the passenger if any action is needed or otherwise how to resolve the alarm condition. In certain embodiments, the information displayed on the video screen can describe the cause of the false alarm and allow input to determine if the alarm signal is not a false alarm.

If the alarm response controller determines that the alarm signal indicates a true alarm condition, in operation 216 the video session is initiated via the video system with a dispatch center in response to the true alarm condition. In operation 218 the dispatch center is provided with the at least one operation parameter from the elevator car, via the elevator control system. In certain embodiments, in operation 220 a control signal from the dispatch center is provided to the elevator car. Further, in certain embodiments, in operation 222 a communication session with a technician device is initiated via the dispatch center.

The terminology used herein is for the purpose of describing particular embodiments only and is not intended to be limiting of the embodiments. While the description of the present embodiments has been presented for purposes of illustration and description, it is not intended to be exhaustive or limited to the embodiments in the form disclosed. Many modifications, variations, alterations, substitutions or equivalent arrangement not hereto described will be apparent to those of ordinary skill in the art without departing from the scope and spirit of the embodiments. Additionally, while various embodiments have been described, it is to be understood that aspects may include any number of the described embodiments. Accordingly, the embodiments are not to be seen as limited by the foregoing description, but are only limited by the scope of the appended claims. The terms "a" and "an" and "the" herein do not denote a limitation of quantity, and are to be construed to cover both the singular and the plural, unless otherwise indicated herein or clearly contradicted by context.

What is claimed is:

1. A method to communicate with a passenger in a car within a transportation system, the method comprising:
   receiving an alarm signal from the car;
   receiving at least one operation parameter from the car;
   analyzing the at least one operation parameter corresponding to the alarm signal from the car;
   determining an alarm condition in response to the at least one operation parameter and the alarm signal; and
   initiating a video session via a video system in response to the alarm signal;
   wherein determining the alarm condition comprises determining a true alarm condition or a false alarm condition in response to the at least one operation parameter and the alarm signal.

2. The method of claim 1, wherein the car is an elevator car.

3. The method of claim 1, further comprising:
   initiating the video session via the video system with a dispatch center in response to the false alarm condition.

4. The method of claim 1, further comprising:
   initiating the video session via the video system with a dispatch center in response to the true alarm condition.

5. The method of claim 4, further comprising:
   initiating a communication session with a technician device via the dispatch center.

6. The method of claim 4, further comprising:
providing the dispatch center with the at least one operation parameter from the car via a control system.

7. The method of claim 4, further comprising:
providing a control signal from the dispatch center to the car.

8. The method of claim 1, further comprising:
displaying a video via the video system in response to the false alarm condition.

9. The method of claim 1, further comprising:
initiating the alarm signal in response to a trapped passenger condition.

10. A system for communication with a passenger within a transportation system, the system comprising:
a car of the transportation system to provide an alarm signal, wherein the car includes a video system;
a control system to provide at least one operation parameter corresponding to the car; and
an alarm response controller to analyze the at least one operation parameter corresponding to the alarm signal and to selectively determine an alarm condition, wherein the alarm response controller initiates a video session via the video system in response to the alarm signal;
wherein the alarm response controller determines a true alarm condition or a false alarm condition for the alarm condition.

11. The system of claim 10, wherein the car is an elevator car.

12. The system of claim 10, wherein the alarm response controller initiates the video session via the video system with a dispatch center in response to the false alarm condition.

13. The system of claim 10, wherein the alarm response controller initiates a video session with a dispatch center in response to the true alarm condition.

14. The system of claim 13, wherein the alarm response controller initiates a communication session with a technician device and the dispatch center.

15. The system of claim 13, wherein the dispatch center receives at least one operation parameter from the control system.

16. The system of claim 13, wherein the dispatch center provides a control signal to the car.

17. The system of claim 10, wherein the video system includes a video camera and a video screen.

18. The system of claim 10, wherein the car includes a control panel to selectively provide the alarm signal.

* * * * *